(12) United States Patent
Zhang et al.

(10) Patent No.: US 11,281,915 B2
(45) Date of Patent: Mar. 22, 2022

(54) PARTIAL FRAME PERCEPTION

(71) Applicant: Black Sesame International Holding Limited, Santa Clara, CA (US)

(72) Inventors: Yuekun Zhang, San Jose, CA (US); Zuoguan Wang, Los Gatos, CA (US); Jizhang Shan, Los Gatos, CA (US); Ying Zhou, Cupertino, CA (US)

(73) Assignee: BLACK SESAME TECHNOLOGIES INC., San Jose, CA (US)

( * ) Notice: Subject to any disclaimer, the term of this patent is extended or adjusted under 35 U.S.C. 154(b) by 4 days.

(21) Appl. No.: 16/706,259

(22) Filed: Dec. 6, 2019

(65) Prior Publication Data

US 2021/0174096 A1 Jun. 10, 2021

(51) Int. Cl.
*G06K 9/00* (2006.01)
*G06K 9/20* (2006.01)

(52) U.S. Cl.
CPC ..... *G06K 9/00785* (2013.01); *G06K 9/00825* (2013.01); *B60R 2300/30* (2013.01); *G06K 9/2054* (2013.01)

(58) Field of Classification Search
CPC .. G06K 9/00785–00825; G06K 9/2054; B60R 2300/15; B60R 2300/30; B60R 2300/303
See application file for complete search history.

(56) References Cited

U.S. PATENT DOCUMENTS

| | | | |
|---|---|---|---|
| 2002/0031242 A1* | 3/2002 | Yasui | G06K 9/00798 382/104 |
| 2007/0211144 A1* | 9/2007 | Fujita | G06T 7/00 348/142 |
| 2017/0225621 A1* | 8/2017 | Shiohara | H04N 7/181 |
| 2017/0267178 A1* | 9/2017 | Shiga | B60K 35/00 |

* cited by examiner

*Primary Examiner* — Casey L Kretzer
(74) *Attorney, Agent, or Firm* — Timothy T. Wang; Ni, Wang & Massand, PLLC

(57) ABSTRACT

A method of partial frame perception, comprising receiving a bottom portion of an inverted image, detecting traffic areas of interest in the bottom portion of the inverted image, streaming the detected traffic areas of interest to a perception processor, receiving a top portion of the inverted image, detecting stationary areas of interest in the top portion of the inverted image and streaming the detected stationary areas of interest to the perception processor.

18 Claims, 11 Drawing Sheets

PARTIAL FRAME PERCEPTION

BACKGROUND

Technical Field

The instant disclosure is related to advanced driver assistance systems (ADAS) and specifically to detecting objects utilizing a partial frame.

Background

Advanced driver assistant system (ADAS) is one of the fastest growing techniques in the automotive industry. ADAS provides functions such as automatic emergency braking and lane assist, which are believed to be able to reduce traffic accidents. ADAS functions are built on the rapid perception of the surrounding environment.

Current ADAS systems utilize a full frame perception from which to base decisions. This use of full frames does not prioritize the perception of roadway objects over the perception of buildings and signs. Latency becomes an issue for the rapid perception of the surrounding environment.

A method is sought to reduce the latency for the perception of roadway objects.

SUMMARY

A first example method of partial frame perception, comprising at least one of receiving a bottom portion of an inverted image, detecting traffic areas of interest in the bottom portion of the inverted image, streaming the detected traffic areas of interest to a perception processor, receiving a top portion of the inverted image, detecting stationary areas of interest in the top portion of the inverted image and streaming the detected stationary areas of interest to the perception processor.

A second method of partial frame perception, comprising at least one of receiving a bottom portion of an inverted image, storing the bottom portion of the inverted image to a bottom frame buffer, detecting traffic areas of interest in the bottom portion of the inverted image, receiving a top portion of the inverted image, storing the top portion of the inverted image to a top frame buffer and detecting stationary areas of interest in the top portion of the inverted image.

DESCRIPTION OF THE DRAWINGS

In the drawings:

FIG. 5-1 is the first part of an example timing sequence for a full frame perception;

FIG. 5-2 is the second part of an example timing sequence for a full frame perception;

FIG. 7-1 is the first part of an example timing sequence for a partial frame perception in accordance with one embodiment of the disclosure;

FIG. 7-2 is the second part of an example timing sequence for a partial frame perception in accordance with one embodiment of the disclosure;

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
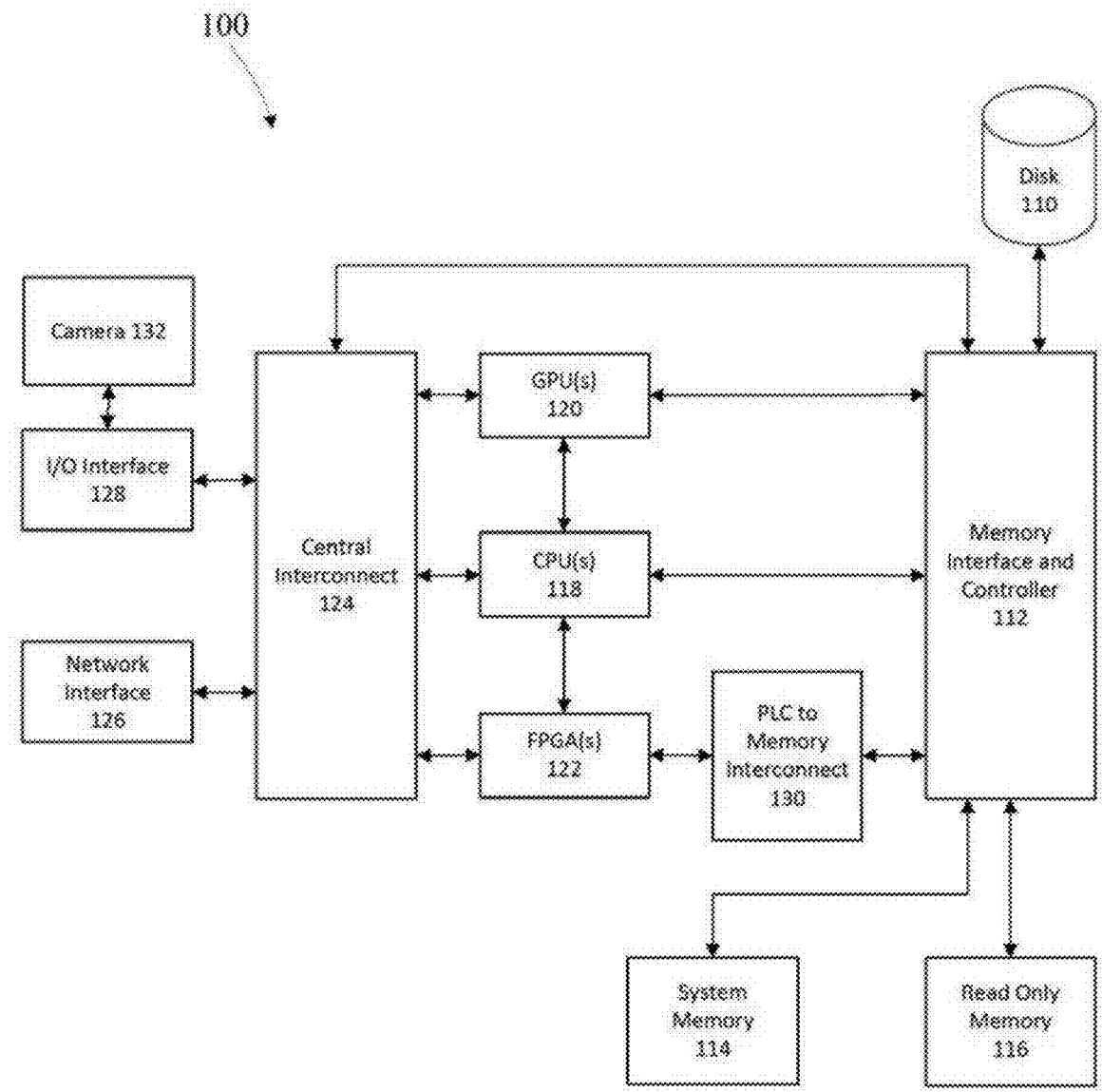
FIG. 1 is a first example system diagram in accordance with one embodiment of the disclosure.

FIG. 1 depicts an example hybrid computational system 100 that may be used to implement neural nets associated with the operation of one or more portions or steps of processes 500 and 600. In this example, the processors associated with the hybrid system comprise a field programmable gate array (FPGA) 122, a graphical processor unit (GPU) 120 and a central processing unit (CPU) 118.

The processing units 118, 120 and 122 have the capability of providing a neural net. A CPU is a general processor that may perform many different functions, its generality leads to the ability to perform multiple different tasks, however, its processing of multiple streams of data is limited and its function with respect to neural networks is very limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are specialized for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected to one other and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

Figure 2:
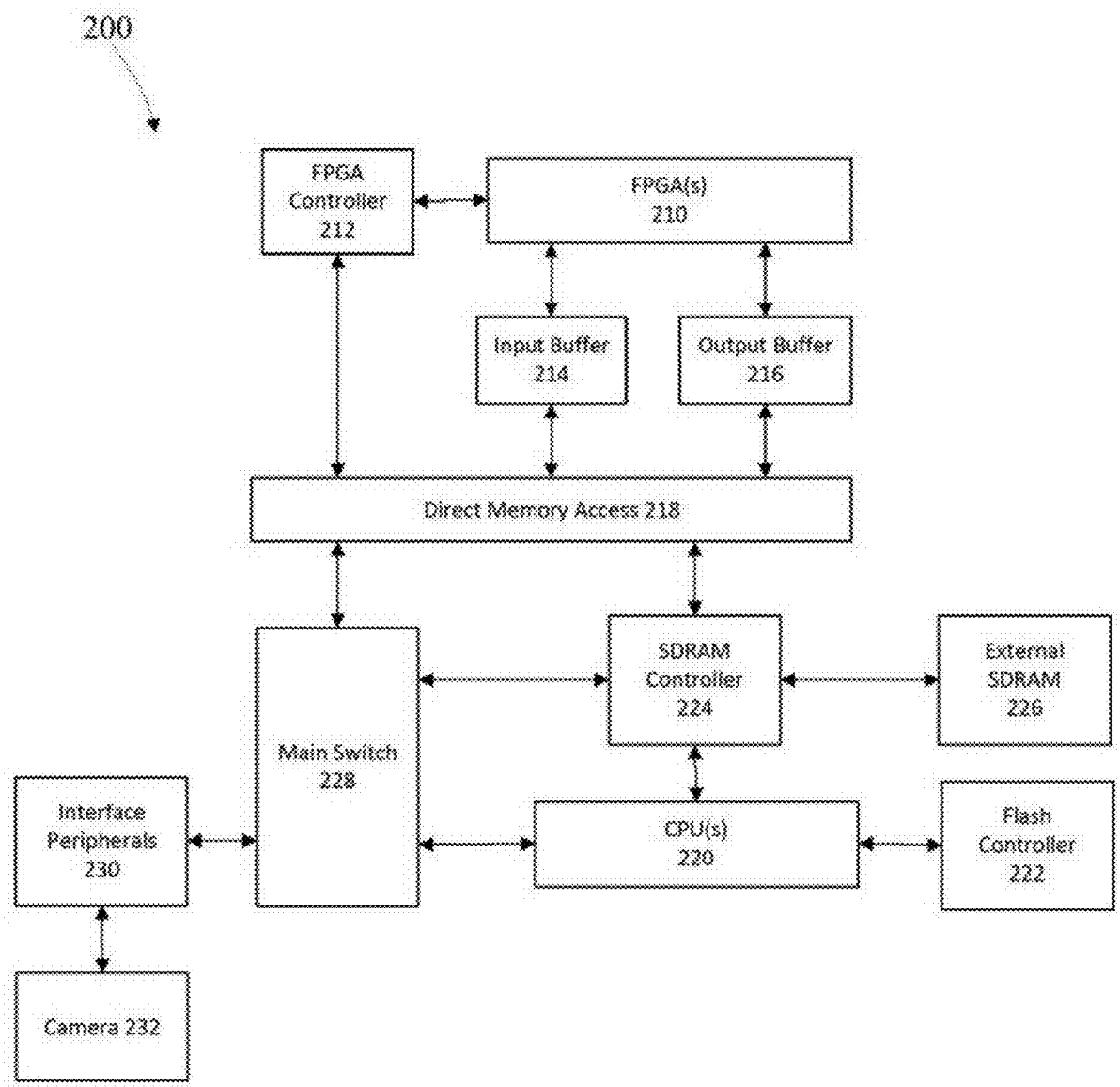
FIG. 2 is a first example system diagram in accordance with one embodiment of the disclosure.

The system of FIG. 2 may be utilized for programming and training the FPGA. The GPU functions with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 connected to a camera 132 and the network interface 126.

FIG. 2 depicts a second example hybrid computational system 200 that may be used to implement neural nets associated with the operation of one or more portions or steps of process 500. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, both of which are coupled to the FPGA to buffer data into and out of the FPGA respectively. The DMA 218 has two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to a synchronous dynamic random access memory (SDRAM) controller 224 which allows data to be shuttled to and from the FPGA to the CPU 220, the SDRAM controller is also connected to external SDRAM 226 and the CPU 220. The main switch 228 is connected to the peripherals interface 230 connected to a camera 232. A flash controller 222 controls persistent memory and is connected to the CPU 220.

Figure 3:
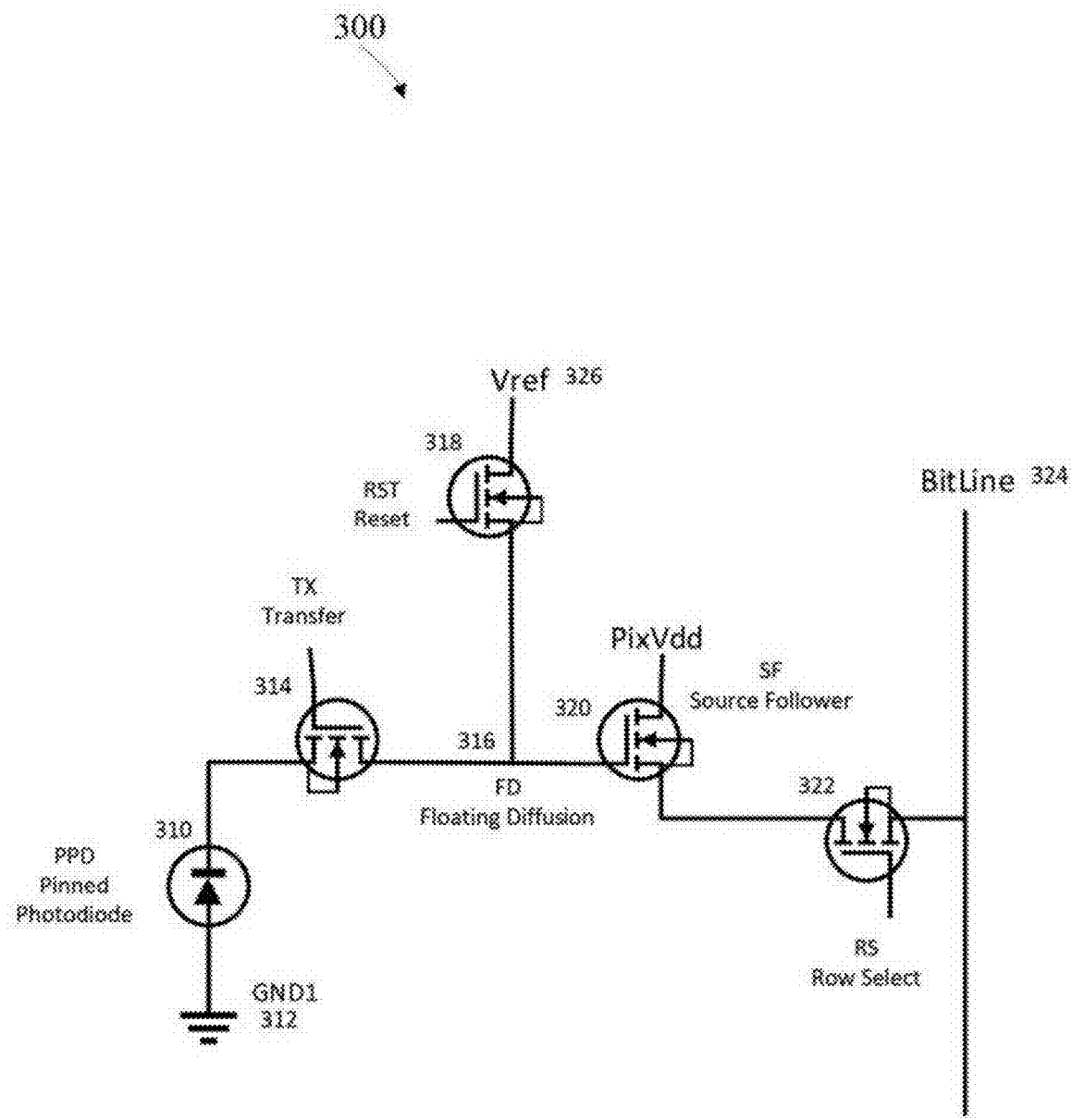
FIG. 3 is an example four transistor photoreceptor in accordance with one embodiment of the disclosure.

FIG. 3 is an example four transistor (4T) photodiode schematic. In 4T operation, an integration period is completed, followed by the reset of the floating diffusion node. This reset value is sampled prior to the transfer transistor switching to sample and empty the photodiode. This is referred to as correlated double sampling and is used to reduce thermal and fixed pattern noise. Since the floating diffusion node is read at both the signal and reset, it is removed when the two signals are subtracted from one another.

A four transistor (4T) active pixel operation has a reset period, an integration period and a read-out period. The pinned photodiode 310 is connected to ground 312 at one end and to the source of a transfer transistor 314 at the other end. A floating diffusion 316 is connected to the drain of transfer transistor 314, the source of the reset transistor 318 and the gate of the source follower transistor 320. The reset transistor 318 is has its drain connected to a reference voltage 326 and its source connected to the floating diffusion 316. The source follower transistor 320 has its gate connected to the floating diffusion 316, its drain connected to pixel power (PixVdd) and its source connected to the drain of row select transistor 322. The row select transistor 322 has its drain connected to the source of the source follower transistor 320, and its source connected to the bit-line 324.

A reset period (pre-charge) occurs when the RST and TX transistor channels are opened to charge the floating node to reset voltage, placing the photodiode in reverse bias. An integration period (exposure) occurs when the TX transistor channel is closed and charge is being accumulated by the photodiode. A read-out period (sample) occurs after the end of the integration period, the RS and RST transistor channels are opened to sample the floating node reset value, then the TX transistor channel is opened to sample the signal value and empty the diode, this is known as correlated double sampling (CDS).

A rolling shutter CMOS sensor may be operated by rolling over rows of pixels-array. Pixels within same row will be operated during the reset, integration and read-out periods together and share TX and RS signals. The process time of the row is equivalent, which is known as hts and is measured in clock cycles. Pixel functions including pixels read-out are timed to finish within the row process time. The integration period is measured in rows, which is known as exposure and has a unit of row. The frame time is also measured in rows, which is known as vts and has a unit of row.

Figure 4:
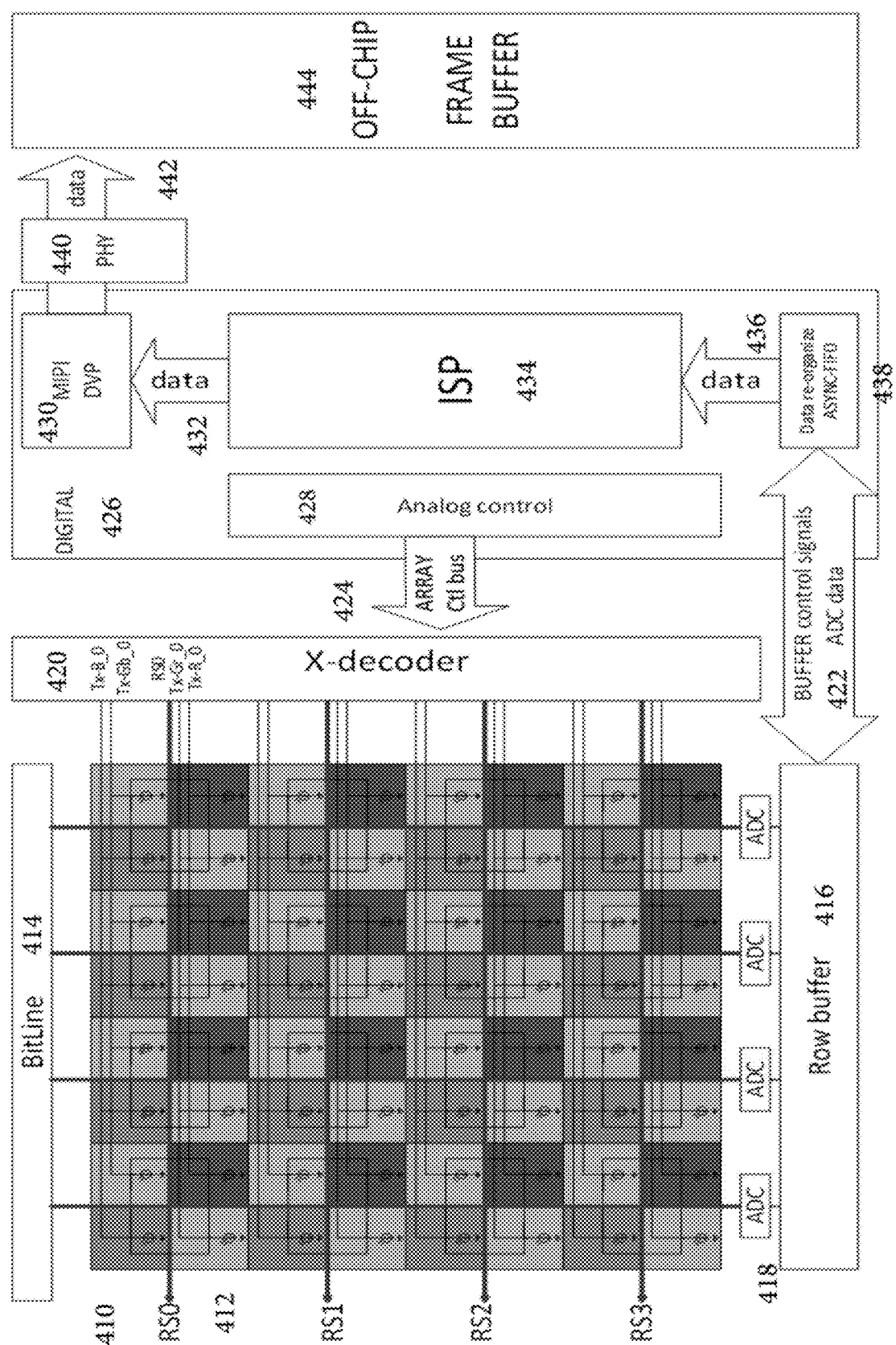
FIG. 4 is an example system in accordance with one embodiment of the disclosure.

FIG. 4 depicts example Bayer pattern 2×2 pixel share half-row rolling shutter CMOS image sensor architecture. In this example the photodiode array 410 is connected to common rows RS0 . . . RSN 412. The rows are connected to x-decoder 420, which receives array control signals 424 from an analog control module 428. The columns are connected to bit-line 414 and the outputs are connected to analog to digital converters 418 leading to a row buffer 416. The row buffer 416 is connected to the buffer control 422. The buffer control 422 transmits and receives data from the data reorganize asynchronous first in first out (FIFO) buffer 438. The row data 436 is sent to the image signal processor (ISP) 434 which sends the row data 432 to the MIPI DVP module 430 which in turn outputs the data to the physical layer 440, sending row data 442 to an off chip frame buffer 444.

Figures 1, 5:
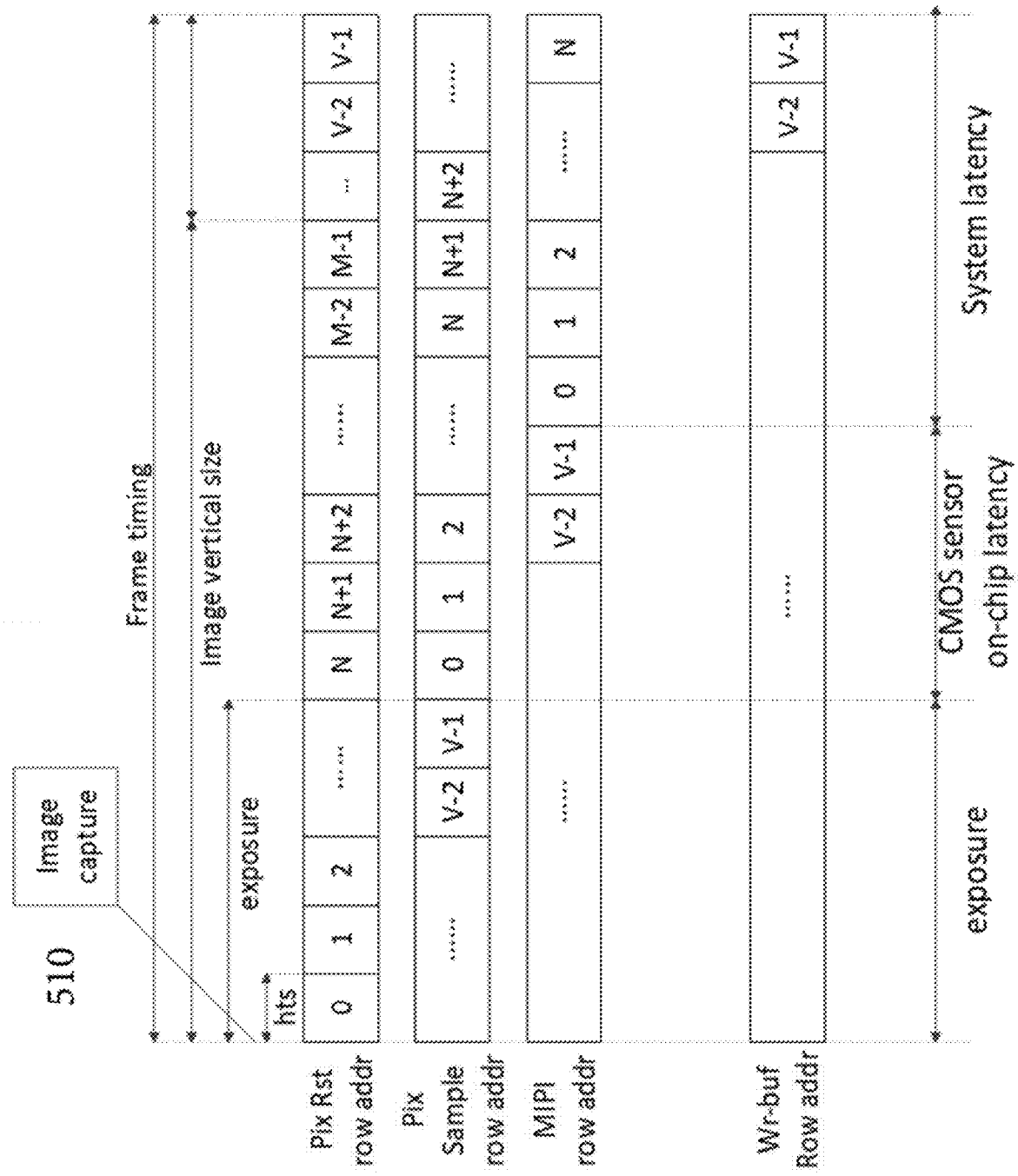
Figures 2, 5:
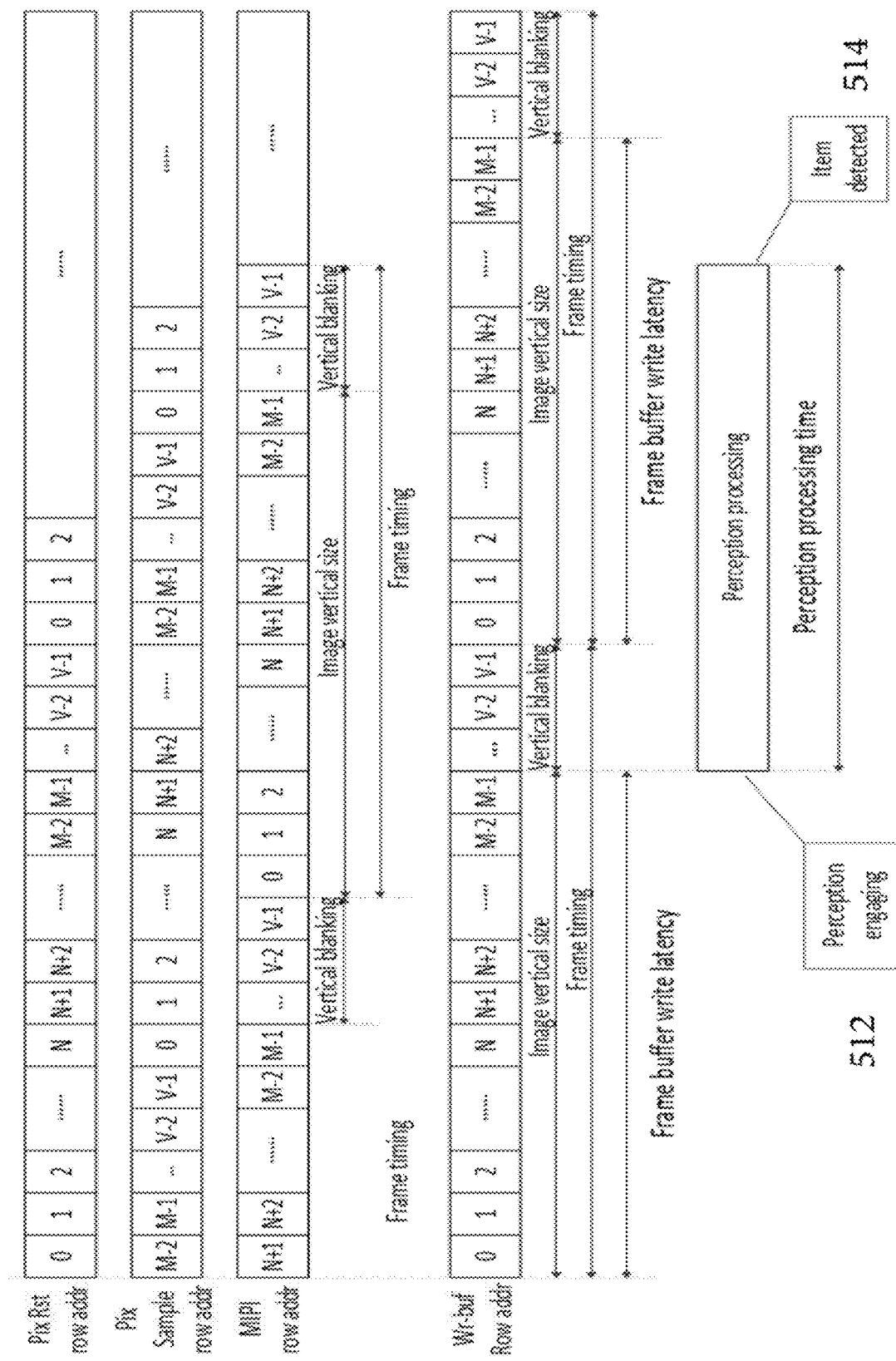

FIGS. 5-1 and 5-2 depict a full frame timing sequence, image capture occurs at 510 and perception engagement 512 to item detection 514. The total latency calculation for a full frame timing sequence is shown below.

$$\text{Total latency} = T_{exposure} + T_{on\text{-}chip\_delay} + T_{system\_delay} + T_{frame\text{-}buffer\_wr} + T_{perception\text{-}processing}$$

$$\text{Total latency} = T_{on\text{-}chip\_delay} + T_{system\_delay} + T_{perception\text{-}processing} + hts*(M+N)$$

Figure 6:
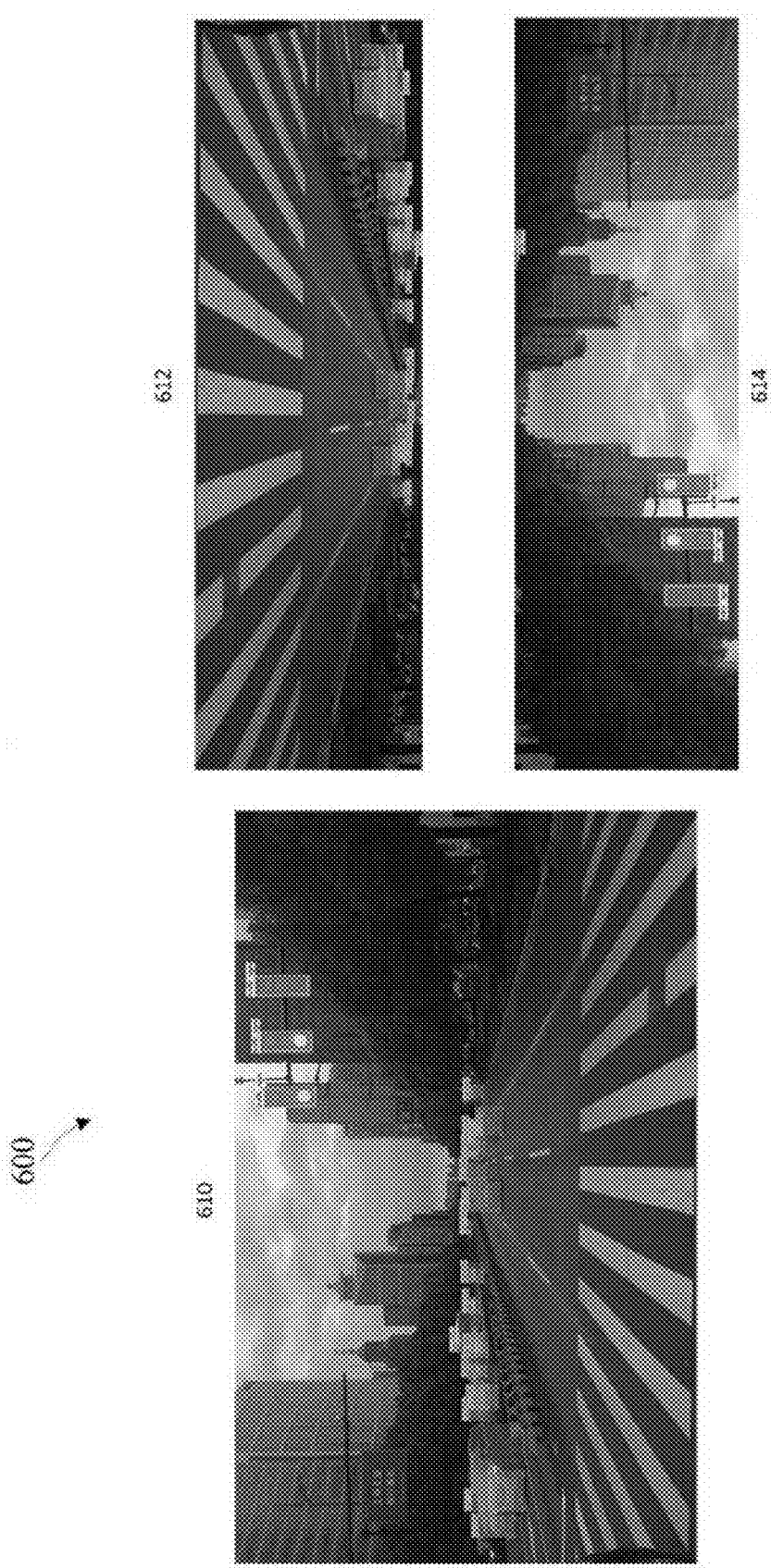
FIG. 6 is an example of captured frames in accordance with one embodiment of the disclosure.

FIG. 6 depicts a full frame image 610, which is broken up into two parts a traffic portion 612 which is most relevant to ADAS decision making and a stationary portion 614 which has a secondary relevancy to ADAS decision making.

The majority of traffic, which is most relevant to the ADAS perception system, is located in bottom half of the image. The disclosed perception system uses reversed camera(s) or flip-sample function of image sensor(s) to sample the image from the bottom row. The image is cut into at least two portions which may overlap, the disclosed perception system may be engaged as soon as possible when bottom part of the image having a relative height of P rows over M total rows (P/M) are stored in frame buffer. The other less relevant portion of the image, the upper part of the image having a height of Q rows over M total rows (Q/M), will be processed afterwards. In this example the heights of the top portion P and the bottom portion Q may equal or surpass the total frame height M, (P+Q>=M). The disclosed perception system may have lower latency on sensing the traffic portion of the circumstance since the frame-buffer write time will decrease, and also have lower latency on sensing of the stationary portion since the processing data time decreases compared to current perception systems.

Figures 1, 7:
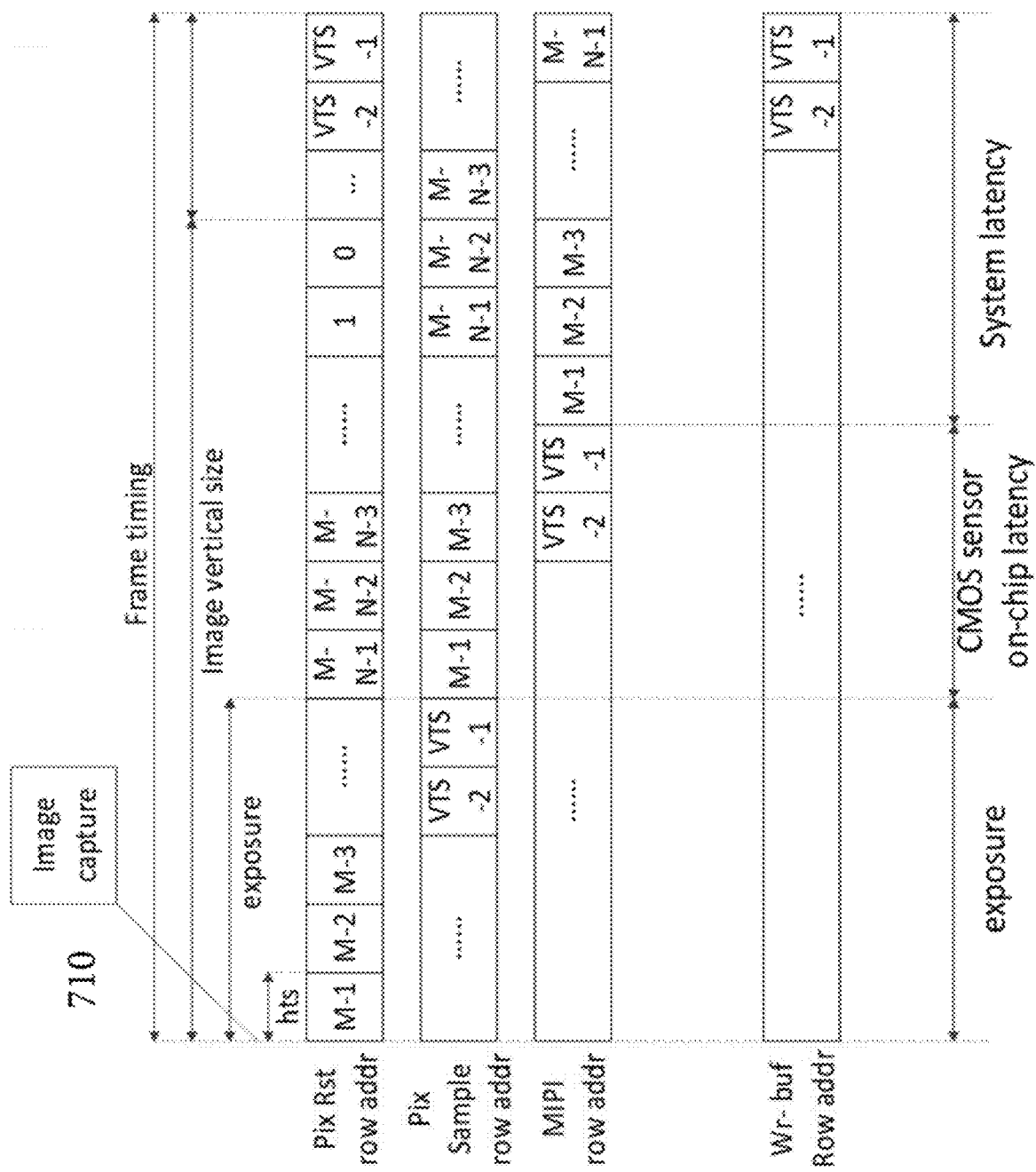
Figures 2, 7:
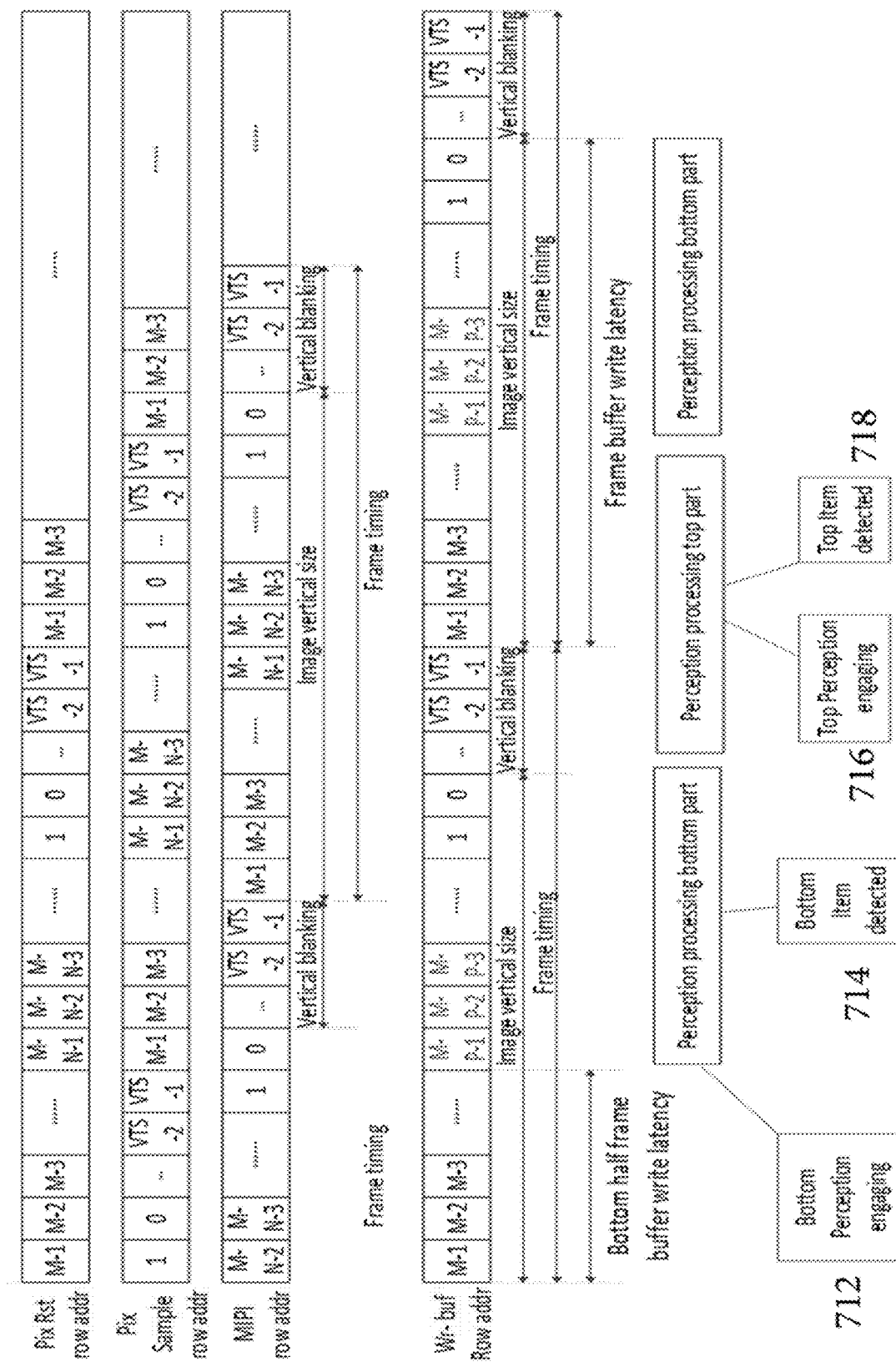

FIGS. 7-1 and 7-2 depict a partial frame timing sequence, image capture occurs at 710, and the bottom frame perception begins at 712 and ends at 714 with item detection. Then top frame perception begins at 716 and detects items at 718. The latency calculations for the bottom portion of the frame and the top portion of the frame are shown below.

$$\text{Bottom perception latency} = T_{exposure} + T_{on\text{-}chip\_delay} + T_{system\_delay} + P/M * T_{frame\text{-}buffer\_wr} + P/M * T_{perception\text{-}processing}$$

$$\text{Bottom perception latency} = T_{on\text{-}chip\_delay} + T_{system\_delay} + P/M * T_{perception\text{-}processing} + hts*(P+N)$$

$$\text{Top perception latency} = T_{exposure} + T_{on\text{-}chip\_delay} + T_{system\_delay} + P/M * T_{frame\text{-}buffer\_wr} + (P+Q)/M * T_{perception\text{-}processing}$$

$$\text{Top perception latency} = T_{on\text{-}chip\_delay} + T_{system\_delay} + (P+Q)/M * T_{perception\text{-}processing} + hts*(P+N)$$

Where $T_{exposure}$ is defined as how many sensor processing rows the pixel need for integration.

$T_{exposure} = N*hts$.

$T_{on\text{-}chip\_delay}$ is defined as the latency from opening transition gate of certain row of pixels during read-out stage to this row of pixels output through MIP PHY.

$T_{system\_delay}$ is defined as the latency of certain row of pixels transition from CMOS image sensor (CIS) to the system frame buffer.

$T_{frame\text{-}buffer\_wr}$ is defined as the time of frame buffer needed for writing one full frame.

The mechanism of frame buffer writing is based on rolling shutter CIS architecture and a pixel array structure. Since the CIS produces one row data per row processing time (hts), the system frame buffer can accept same input data rate despite large buffer bandwidths. And the system frame buffer will also be written row by row, in the same way the CIS outputs the image data. The total one frame writing time will depends on CIS row processing time (hts) and image vertical size. Equals to hts*M Compared to current perception systems, the disclosed system will decrease the latency as shown below.

$$\text{Bottom portion latency reduction} = (M-P)/M * T_{perception\text{-}processing} + hts*(M-P) = (M-P)/M*(T_{perception\text{-}processing} + hts*M)$$

$$\text{Total latency reduction} = hts*(M-P) - (P+Q-M)/M * T_{perception\text{-}processing}$$

In a system in which the frame is halved, the total latency will decrease by half a frame. Using a dual camera system in which one camera samples the bottom part of the image and a second camera samples the top part of the image, if last page setup is used, the frame rate may be increased from 30 fps to 60 fps.

Figure 8:
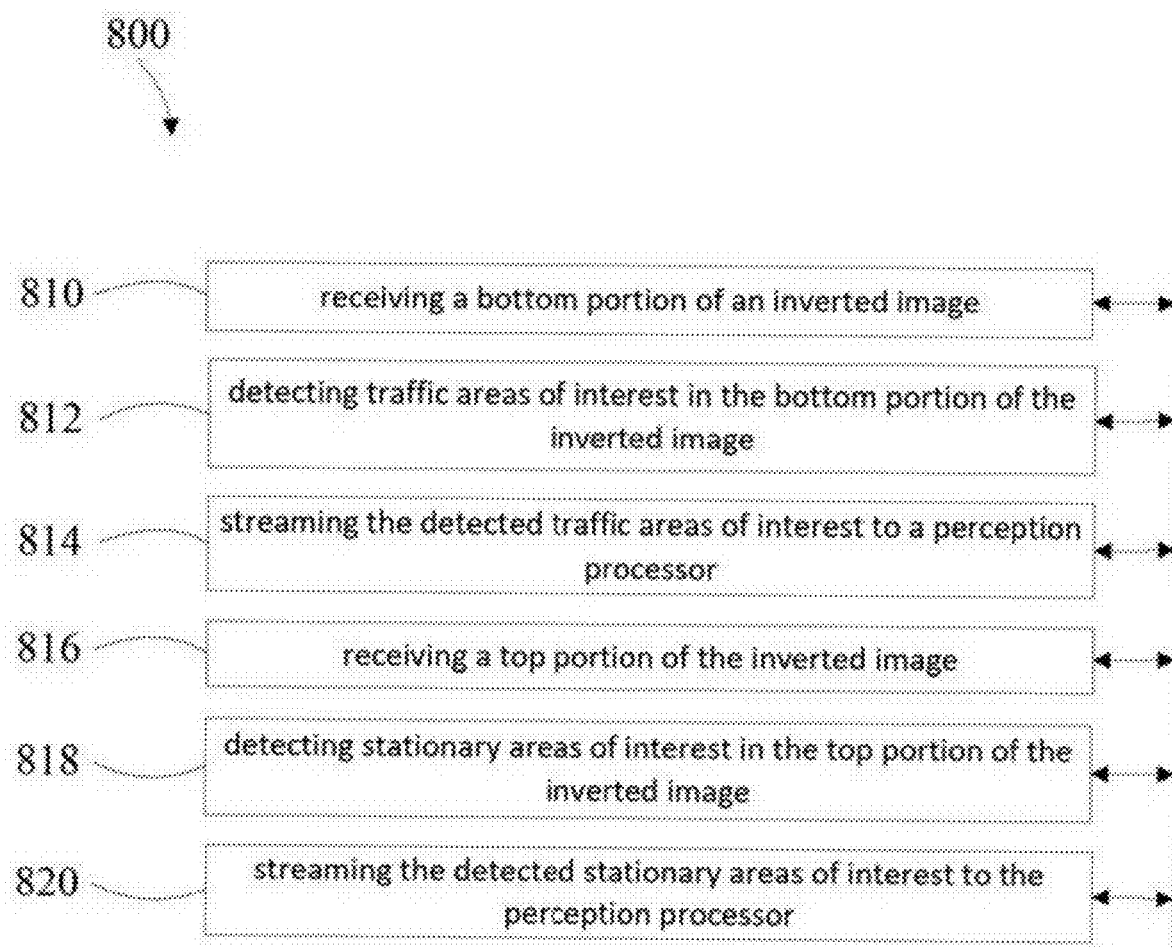
FIG. 8 is a first example method of partial frame perception in accordance with one embodiment of the disclosure.

FIG. 8 depicts a method of partial frame perception, comprising receiving 810 a bottom portion of an inverted image, detecting 812 traffic areas of interest in the bottom portion of the inverted image, streaming 814 the detected traffic areas of interest to a perception processor, receiving 816 a top portion of the inverted image, detecting 818 stationary areas of interest in the top portion of the inverted image and streaming 820 the detected stationary areas of interest to the perception processor.

Figure 9:
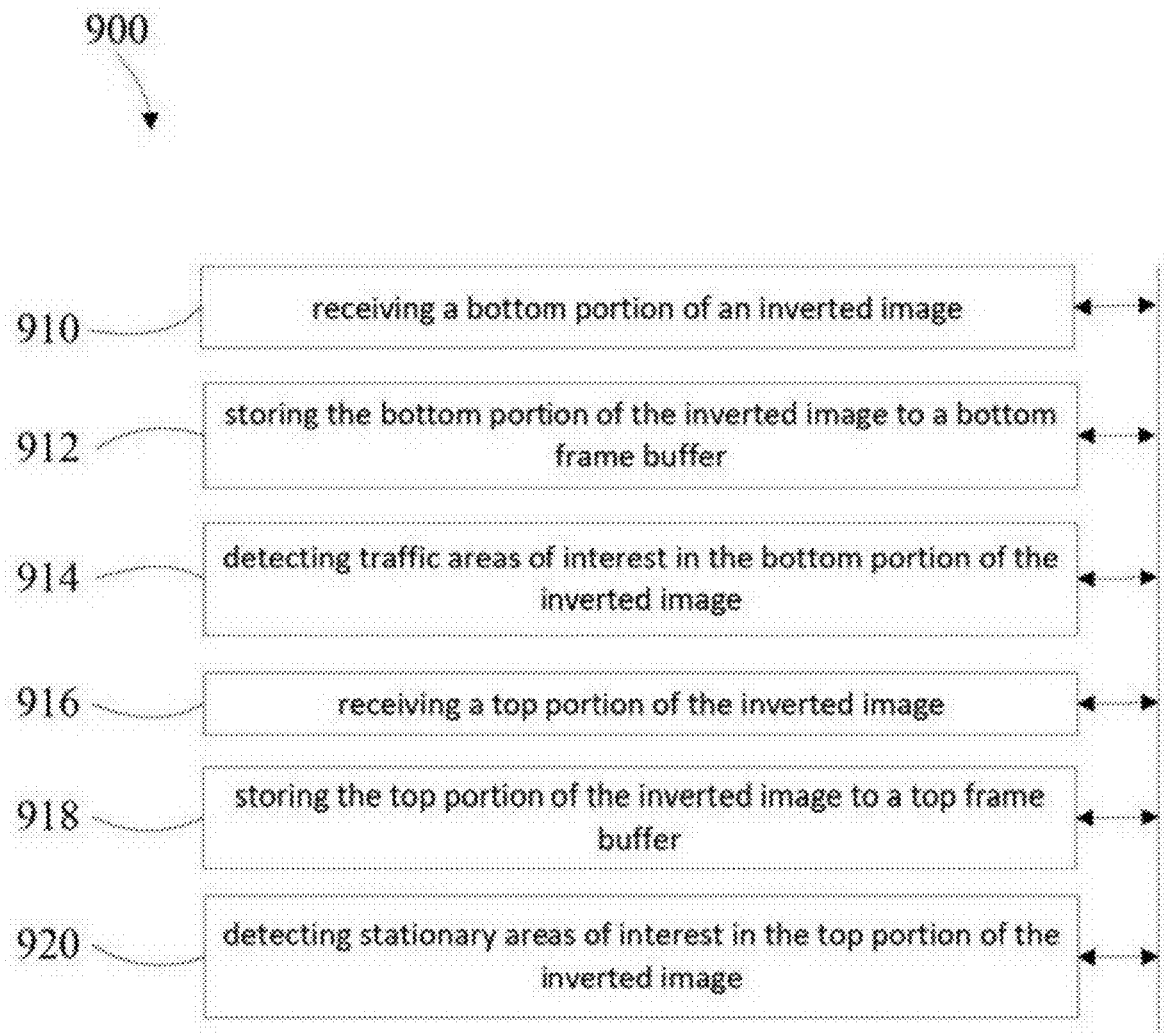
FIG. 9 is a second example method of partial frame perception in accordance with one embodiment of the disclosure.

FIG. 9 depicts a method of partial frame perception, comprising receiving 910 a bottom portion of an inverted image, storing 912 the bottom portion of the inverted image to a bottom frame buffer, detecting 914 traffic areas of interest in the bottom portion of the inverted image, receiving 916 a top portion of the inverted image, storing 918 the top portion of the inverted image to a top frame buffer and detecting 920 stationary areas of interest in the top portion of the inverted image.

The methods of FIGS. 8 and 9 may receive the inverted image from a reversed camera. The method may also comprise inverting a non-inverted image based on flipping the non-inverted image and asymmetrically filtering at least one of the bottom portion of the inverted image and the top portion of the inverted image. The method may comprise integrating the bottom portion of the inverted image and the top portion of the inverted image, and or storing the top portion of the inverted image to a top frame buffer and storing the bottom portion of the inverted image to a bottom frame buffer. The method may additionally comprise receiving a non-inverted image and inverting the non-inverted image, and or the bottom portion of the inverted image may be received from a first camera and the top portion of the inverted image may be received from a second camera.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of partial frame perception, comprising:
   receiving a traffic portion of an inverted image in a half-row rolling, shutter format;
   detecting traffic areas of interest in a rectangular traffic portion of the inverted image beginning with the traffic portion nearest a vehicle based on an inverted image format and prioritizing the detection of the traffic areas of interest;
   streaming the detected traffic areas of interest to a perception processor;
   receiving a stationary portion of the inverted image in the half-row rolling shutter format, wherein the inverted image only includes the rectangular traffic portion and a rectangular stationary portion;
   detecting stationary areas of interest in the rectangular stationary portion of the inverted image beginning with the stationary portion nearest the vehicle based on the inverted image format after detection of the traffic areas of interest; and
   streaming the detected stationary areas of interest to the perception processor.

2. The method of partial frame perception of claim 1, further comprising inverting a non-inverted image based on flipping the non-inverted image.

3. The method of partial frame perception of claim 1, further comprising asymmetrically filtering the traffic portion of the inverted image.

4. The method of partial frame perception of claim 1, further comprising asymmetrically filtering the stationary portion of the inverted image.

5. The method of partial frame perception of claim 1, further comprising integrating the traffic portion of the inverted image and the stationary portion of the inverted image.

6. The method of partial frame perception of claim 1, further comprising storing the stationary portion of the inverted image to a top frame buffer.

7. The method of partial frame perception of claim 1, further comprising storing the traffic portion of the inverted image to a bottom frame buffer.

8. The method of partial frame perception of claim 1, further comprising receiving a non-inverted image and inverting the non-inverted image.

9. The method of partial frame perception of claim 1, wherein the traffic portion of the inverted image is received from a first camera and the stationary portion of the inverted image is received from a second camera.

10. A method of partial frame perception, comprising:
    receiving a rectangular traffic portion of an inverted image in a half-row rolling shutter format;
    storing the traffic portion of the inverted image to a bottom frame first in first out buffer;
    detecting traffic areas of interest in the traffic portion of the inverted image beginning with the traffic portion nearest a vehicle based on an inverted image format in the bottom frame first in first out buffer and prioritizing the detection of the traffic areas of interest;
    receiving a rectangular stationary portion of the inverted image in the half-row rolling shutter format, wherein the inverted image only includes the rectangular traffic portion and the rectangular stationary portion;
    storing the stationary portion of the inverted image to a top frame first in first out buffer; and detecting stationary areas of interest in the stationary portion of the inverted image beginning with the stationary portion nearest the vehicle based on the inverted image format in the top frame first in first out buffer after detection of the traffic areas of interest.

11. The method of partial frame perception of claim 10, further comprising inverting a non-inverted image based on flipping the non-inverted image.

12. The method of partial frame perception of claim 10, further comprising asymmetrically filtering the traffic portion of the inverted image.

13. The method of partial frame perception of claim 10, further comprising asymmetrically filtering the stationary portion of the inverted image.

14. The method of partial frame perception of claim 10, further comprising integrating the traffic portion of the inverted image and the stationary portion of the inverted image.

15. The method of partial frame perception of claim 10, further comprising streaming the detected traffic areas of interest to a perception processor.

16. The method of partial frame perception of claim 10, further comprising streaming the detected stationary areas of interest to a perception processor.

17. The method of partial frame perception of claim 10, further comprising receiving a non-inverted image and inverting the non-inverted image.

18. The method of partial frame perception of claim 10, wherein the traffic portion of the inverted image is received from a first camera and the stationary portion of the inverted image is received from a second camera.

* * * * *